(12) United States Patent
Vanterpool et al.

(10) Patent No.: US 11,214,254 B2
(45) Date of Patent: Jan. 4, 2022

(54) REUTILIZATION OF REGENERATIVE BRAKING ENERGY FOR DELAYING AN ENGINE START EVENT

(71) Applicant: Toyota Motor Engineering & Manufacturing North America, Inc., Plano, TX (US)

(72) Inventors: Monica A. Vanterpool, Ann Arbor, MI (US); Joshua D. Payne, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 308 days.

(21) Appl. No.: 16/400,605

(22) Filed: May 1, 2019

(65) Prior Publication Data
US 2020/0346648 A1    Nov. 5, 2020

(51) Int. Cl.
*B60W 30/18*     (2012.01)
*B60W 20/40*     (2016.01)

(52) U.S. Cl.
CPC ...... *B60W 30/18027* (2013.01); *B60W 20/40* (2013.01); *B60W 30/18127* (2013.01); *B60W 2710/06* (2013.01); *B60Y 2300/18025* (2013.01); *B60Y 2300/18125* (2013.01); *B60Y 2300/43* (2013.01); *F02N 2200/046* (2013.01); *F02N 2200/061* (2013.01); *F02N 2300/2011* (2013.01)

(58) Field of Classification Search
CPC ..... B60W 30/18027; B60W 30/18127; B60W 20/40; B60W 2710/06; B60Y 2300/43; B60Y 2300/18025; F02N 2200/061; F02N 2200/2011
See application file for complete search history.

(56) References Cited

U.S. PATENT DOCUMENTS 8,862,342 B2 * 10/2014 Oguri ................. B60W 30/143
                                                  701/50
9,202,378 B2 * 12/2015 Otake ................. B60W 30/00
(Continued)

FOREIGN PATENT DOCUMENTS

DE    102016222448 A1    5/2018

*Primary Examiner* — Peter D Nolan
*Assistant Examiner* — Wae L Louie
(74) *Attorney, Agent, or Firm* — Christopher G. Darrow; Darrow Mustafa PC

(57) ABSTRACT

System, methods, and other embodiments described herein relate to delaying a start of an internal combustion engine ("ICE") in a hybrid vehicle. In one embodiment, a method includes identifying a stopping location, a regenerative braking event that assists in stopping the hybrid vehicle at the stopping location, and an actual energy value based on a regenerative braking energy generated during the regenerative braking event. The method includes determining an estimated energy value, based on a predicted regenerative braking energy from a predicted braking event, that causes the hybrid vehicle to stop at the stopping location. The method includes determining an energy savings value based, at least in part, on a difference between the actual energy value and the estimated energy value. The method includes, responsive to the ICE being off, delaying the start of the ICE based, at least in part, on the energy savings.

21 Claims, 6 Drawing Sheets

(56) References Cited

U.S. PATENT DOCUMENTS

| | | | |
|---|---|---|---|
| 10,017,172 B2* | 7/2018 | Payne | B60L 15/2009 |
| 10,240,542 B1* | 3/2019 | Salter | F02N 11/08 |
| 2015/0112523 A1* | 4/2015 | Wang | B60W 10/06 |
| | | | 701/22 |
| 2015/0197243 A1* | 7/2015 | Johri | B60W 20/12 |
| | | | 701/22 |
| 2015/0314776 A1* | 11/2015 | Yu | B60W 20/40 |
| | | | 701/22 |
| 2016/0101775 A1* | 4/2016 | Gibson | B60K 6/40 |
| | | | 701/22 |
| 2016/0280205 A1* | 9/2016 | Nefcy | F02N 11/103 |
| 2016/0304086 A1* | 10/2016 | Mansour | B60K 6/48 |
| 2017/0080923 A1* | 3/2017 | Johri | B60K 6/547 |
| 2018/0093650 A1* | 4/2018 | Payne | B60T 8/172 |
| 2019/0031176 A1* | 1/2019 | Huh | B60W 30/192 |
| 2019/0126910 A1* | 5/2019 | Kim | B60W 10/08 |
| 2020/0346648 A1* | 11/2020 | Vanterpool | B60W 10/06 |

* cited by examiner

REUTILIZATION OF REGENERATIVE BRAKING ENERGY FOR DELAYING AN ENGINE START EVENT

TECHNICAL FIELD

Embodiments described herein generally relate to delaying a start of an internal combustion engine in a hybrid vehicle. More specifically, the embodiments relate to systems and methods of directing energy from a regenerative braking event to delay the start of the internal combustion engine.

BACKGROUND

Hybrid vehicles can utilize regenerative braking as an energy recovery mechanism to both slow the vehicle and to convert its kinetic energy into electrical energy that can be either used immediately or stored in the traction battery until needed. The hybrid vehicle includes an electric motor that uses the vehicle's momentum to recover energy that would otherwise be lost to friction brakes as heat. The hybrid vehicle uses two or more distinct types of power and may include an internal combustion engine in addition to the electric motor. Appropriately applied, the recovered energy from the regenerative braking function may be used to reduce fossil fuel consumption of the engine.

SUMMARY

The systems and methods are disclosed herein that relate to a manner of applying the captured regenerative energy to delay a start of an internal combustion engine ("ICE") of a hybrid vehicle to improve fuel economy. In one embodiment, a delay system for delaying the start of the ICE is disclosed. The delay system includes one or more processors and a memory communicably coupled to the one or more processors. The memory stores an energy module including instructions that when executed by the one or more processors cause the one or more processors to identify a stopping location for the hybrid vehicle, an actual energy value based on a regenerative braking energy generated during the regenerative braking event, and an actual energy value based on a regenerative braking energy generated during the regenerative braking event. The energy module further includes instructions to determine an estimated energy value based on a predicted regenerative braking energy from a predicted braking event causing the hybrid vehicle to stop at the stopping location. The predicted braking event is based on user braking data. The energy module further includes instructions to determine an energy savings value based, at least in part, on a difference between the actual energy value and the estimated energy value. The memory stores a threshold module including instructions that when executed by the one or more processors cause the one or more processors to, responsive to the ICE being off, delay the start of the ICE based, at least in part, on the energy savings value.

In another embodiment, a method for delaying a start of the ICE is disclosed. The method includes identifying a stopping location for the hybrid vehicle, a regenerative braking event for the hybrid vehicle that assists in stopping the hybrid vehicle at the stopping location, and an actual energy value based on a regenerative braking energy generated during the regenerative braking event. The method further includes determining an estimated energy value based on a predicted regenerative braking energy from a predicted braking event causing the hybrid vehicle to stop at the stopping location, where the predicted braking event is based on user braking data. The method further includes determining an energy savings value based, at least in part, on a difference between the actual energy value and the estimated energy value. The method further includes, responsive to the ICE being off, delaying the start of the ICE based, at least in part, on the energy savings value.

In another embodiment, a non-transitory computer-readable medium for delaying a start of the ICE is disclosed. The non-transitory computer-readable medium stores instructions that when executed by one or more processors cause the one or more processors to perform the disclosed functions. The instructions include instructions to identify a stopping location for the hybrid vehicle, an actual energy value based on a regenerative braking energy generated during the regenerative braking event, and an actual energy value based on a regenerative braking energy generated during the regenerative braking event. The instructions include instructions to determine an estimated energy value based on a predicted regenerative braking energy from a predicted braking event causing the hybrid vehicle to stop at the stopping location. The predicted braking event is based on user braking data. The instructions include instructions to determine an energy savings value based, at least in part, on a difference between the actual energy value and the estimated energy value. The instructions include instructions to, responsive to the ICE being off, delay the start of the ICE based, at least in part, on the energy savings value.

Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Disclosed herein are systems, methods and other embodiments for utilizing regenerative braking energy captured as a result of coasting guidance to further improve fuel economy by delaying a starting event of an internal combustion engine in a hybrid vehicle. A coasting guidance and control system ("coasting guidance system") notifies a driver of an ideal coasting location in preparation for a stopping event and controls a deceleration drive force to achieve an optimal amount of regenerative braking energy. This captured braking energy can be thought of as an energy savings, which would not have occurred but for the coasting guidance. However, this is not a true energy savings, for the driver could have used regenerative braking as part of a routine stopping event without the use of the coasting guidance. Accordingly, to determine a "true" energy savings generated as a result of using the coasting guidance system for the stopping event, the amount of regenerative energy estimated for the same stopping event without the use of coasting guidance needs to be subtracted out.

This disclosure presents systems and methods that determine this "true" energy savings and translates it into a delay time. During the stopping event, the hybrid vehicle typically turns off the internal combustion engine to conserve fuel. This translated delay time may be applied to delay a start of the internal combustion engine after the stopping event to further conserve fuel.

Figure 1A:
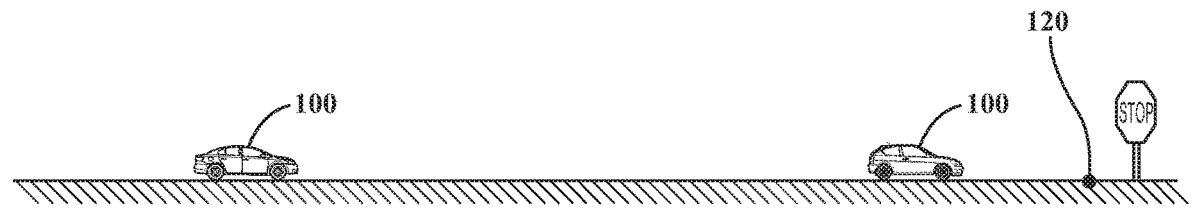
FIG. 1A illustrates an example of a coasting guidance system that assists in stopping a hybrid vehicle at a stopping location.
Figure 1B:
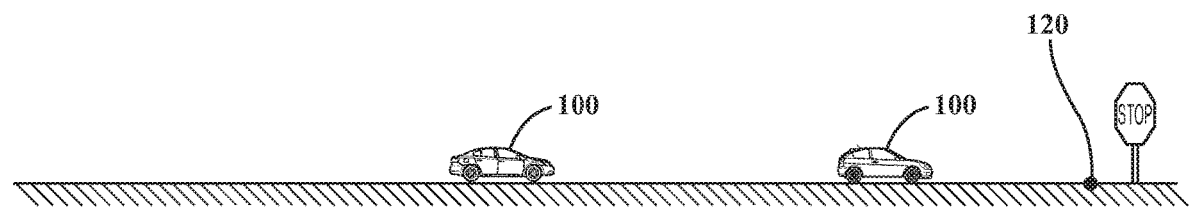
FIG. 1B illustrates an example of the hybrid vehicle of FIG. 1A stopping at the same stopping location shown in FIG. 1A without the use of the coasting guidance system.

FIG. 1A illustrates a hybrid vehicle 100 that includes a coasting guidance system (discussed in detail below in connection with FIG. 3) used to assist in stopping the hybrid vehicle 100 at a stopping location 120. For example, at a time $T_{1A}$, the driver begins to coast, i.e., releases the accelerator pedal, and at a time $T_{2A}$, the driver depresses the brake pedal to apply the energy dissipation brakes, as demonstrated by the time staggered relative distance representations of the hybrid vehicle 100 in FIG. 1A. FIG. 1B illustrates the hybrid vehicle 100 travelling at the same initial speed as the hybrid vehicle in FIG. 1A but stopping at the same stopping location 120 without the use of the coasting guidance system. By comparing FIGS. 1A and 1B, it is likely that the hybrid vehicle in FIG. 1B will start coasting at a distance closer to the stopping location 120 than the hybrid vehicle 100 of FIG. 1A. The effect of this coasting location difference will become apparent with further discussions.

Figure 1C:
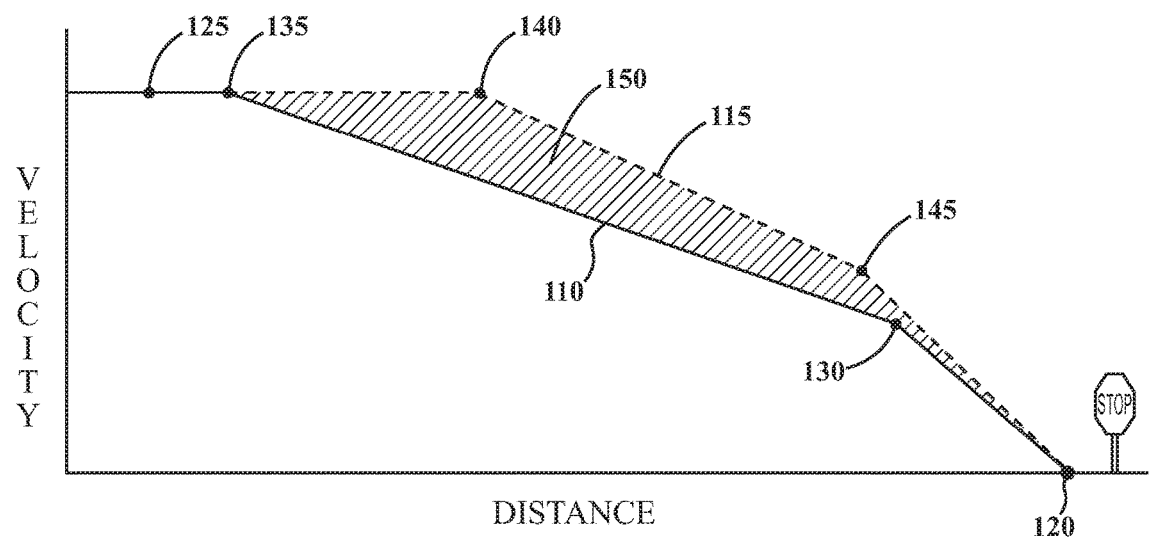
FIG. 1C is a graph of the velocity versus distance for the hybrid vehicle representations of FIGS. 1A and 1B in accordance with one embodiment.

With reference to FIG. 1C, a graph of the velocity versus distance for the hybrid vehicle 100 representations in FIGS. 1A and 1B is shown. FIG. 1C illustrates a regenerative braking event 110 for the hybrid vehicle 100 of FIG. 1A. As set forth below, the coasting guidance system determines an optimal braking location 130, i.e., when a brake pedal is to be depressed, and an ideal coasting location 125 to notify the driver of when to begin coasting that maximizes an energy captured by a regenerative braking system (discussed in detail below in connection with FIG. 3). The actual coasting location 135 is where an accelerator pedal is released by the driver and the hybrid vehicle 100 begins coasting. The coasting guidance system may compensate for the driver's delayed response time and may adjust the deceleration drive force such that the hybrid vehicle 100 reaches the optimal braking location 130 at an optimal velocity to maximize the actual energy captured by the regenerative braking system.

With continued reference to FIGS. 1B and 1C, the distance from the stopping location 120 and the associated speed a driver is predicted to coast and apply the energy dissipative brakes without the use of coasting guidance is represented by a predicted braking event 115 in FIG. 1C. As described further below, an estimated energy is determined from the predicted braking event 115. Key predictive parameters, such as the predicted coasting location 140 and the predicted braking location 145 are used, which are based on user braking data. An energy savings may be determined from a difference between the actual energy captured during regenerative braking event 110 and the estimated energy from the predicted braking event 115. The energy savings is illustrated as an energy saving value 150 as the shaded area in FIG. 1C. The energy savings can be applied to delaying a start of an internal combustion engine in the hybrid vehicle 100 by keeping the hybrid vehicle 100 in electric-only mode.

Figure 2A:
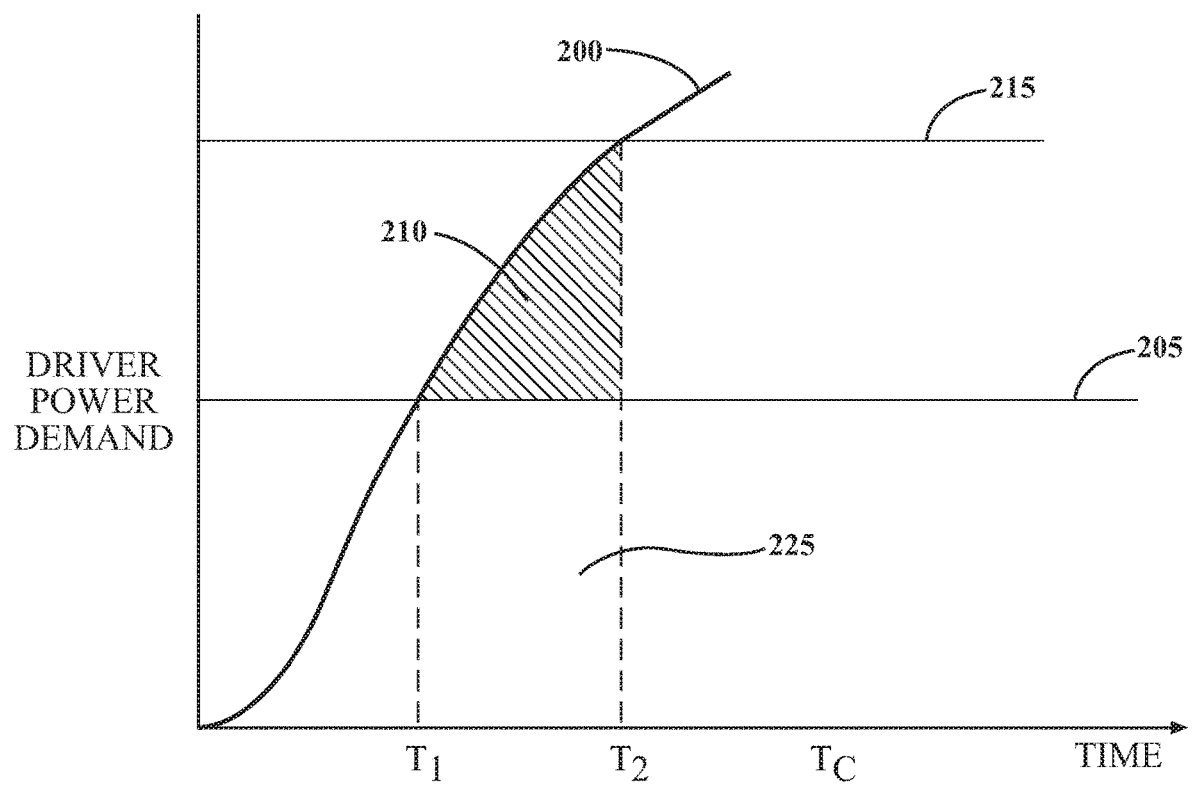
FIG. 2A is a graph of a driver power demand profile versus time representing an internal combustion engine starting at a time $T_2$ in accordance with one embodiment.

FIG. 2A illustrates a graph of driver power demand versus time and includes a power demand profile 200. For example, the power demand profile 200 may represent the power demanded by the driver from depressing the accelerator pedal after the hybrid vehicle 100 has stopped at the stopping location 120. Hybrid powertrain systems may operate based on an engine start threshold 205, which is a driver power demand level above which the internal combustion engine would ordinarily be started. For example, during an idle-stop maneuver where the hybrid powertrain system turns off the internal combustion engine when stopped at a stop sign or a light, the engine would be started once again when the power demand profile 200 reaches the engine start threshold 205 at a time $T_1$.

A driver energy demand 210 starting at the time $T_1$ may be continuously calculated for a portion of the power demand profile that exceeds the engine start threshold 205. For example, the shaded region in FIG. 2A illustrates the driver energy demand 210, which is the area under the power demand profile 200 curve and above the engine start threshold 205. For an increasing driver power demand, the driver energy demand 210 begins to increase over time after the time $T_1$. This increasing driver energy demand 210 may be continuously compared to the energy savings value 150 derived previously from the difference between the energy generated from the regenerative braking event 110 and the estimated energy value based on the predicted braking event 115. A determination whether to start or continue to delay the start of the internal combustion engine may be made based on the comparison. For example, as shown in FIG. 2A, the start of the internal combustion engine is delayed until a time $T_2$. At that time, a comparison between the energy savings value 150 and driver energy demand 210 results in a zero-energy difference, i.e., the energy savings value 150 has been "used up" by the driver energy demand 210. The threshold where the engine starts has essentially been modified, i.e., increased, to a modified engine start threshold 215.

Figure 2B:
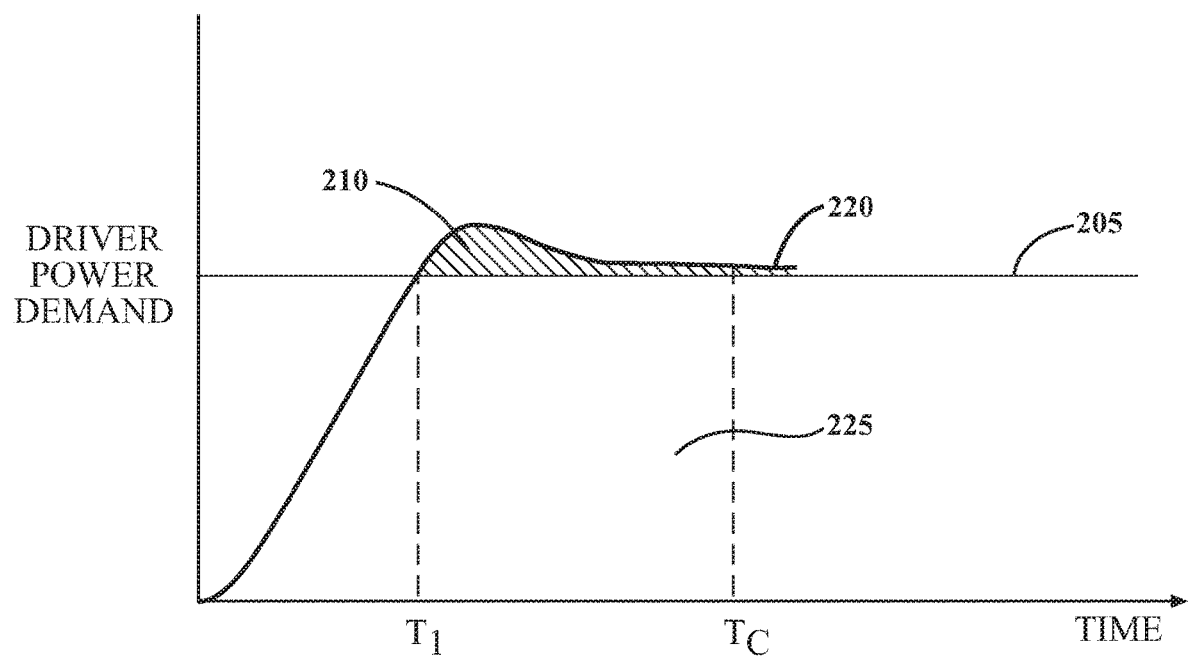
FIG. 2B is a graph of a driver power demand profile versus time representing the internal combustion engine starting a cut-off time Tc in accordance with one embodiment.

Alternative power demands profiles are possible where the start of the internal combustion engine is delayed before the energy savings value 150 is depleted by a driver energy demand. Referring to FIG. 2B, for example, a power demand profile 220 exceeds the engine start threshold 205 at the time $T_1$. However, the comparison between the driver energy demand 210 and the energy savings value 150 results in the driver energy demand 210 being less than the energy savings value 150 at a cut-off time Tc. As will be described below, the cut-off time Tc is the maximum time the internal combustion engine may be off for the current engine start cycle when the driver power demand is above the engine start threshold. When the situation of FIG. 2B occurs, there is energy savings excess by the time Tc occurs, which corresponds to a residual energy value being "left over" that can be applied as a delay to the next engine start cycle. As set forth below, the next engine start cycle may be another regenerative braking event 110 where an additional energy savings value 150 is captured. Alternatively, a stopping event may occur without the use of coasting guidance where the engine is turned off. Further, stop and go traffic may cause the engine to turn off. In any event, the residual energy may be applied in the form of a delay to the next engine start cycle regardless of how the internal combustion engine transitioned from running to an off condition.

Figure 3:
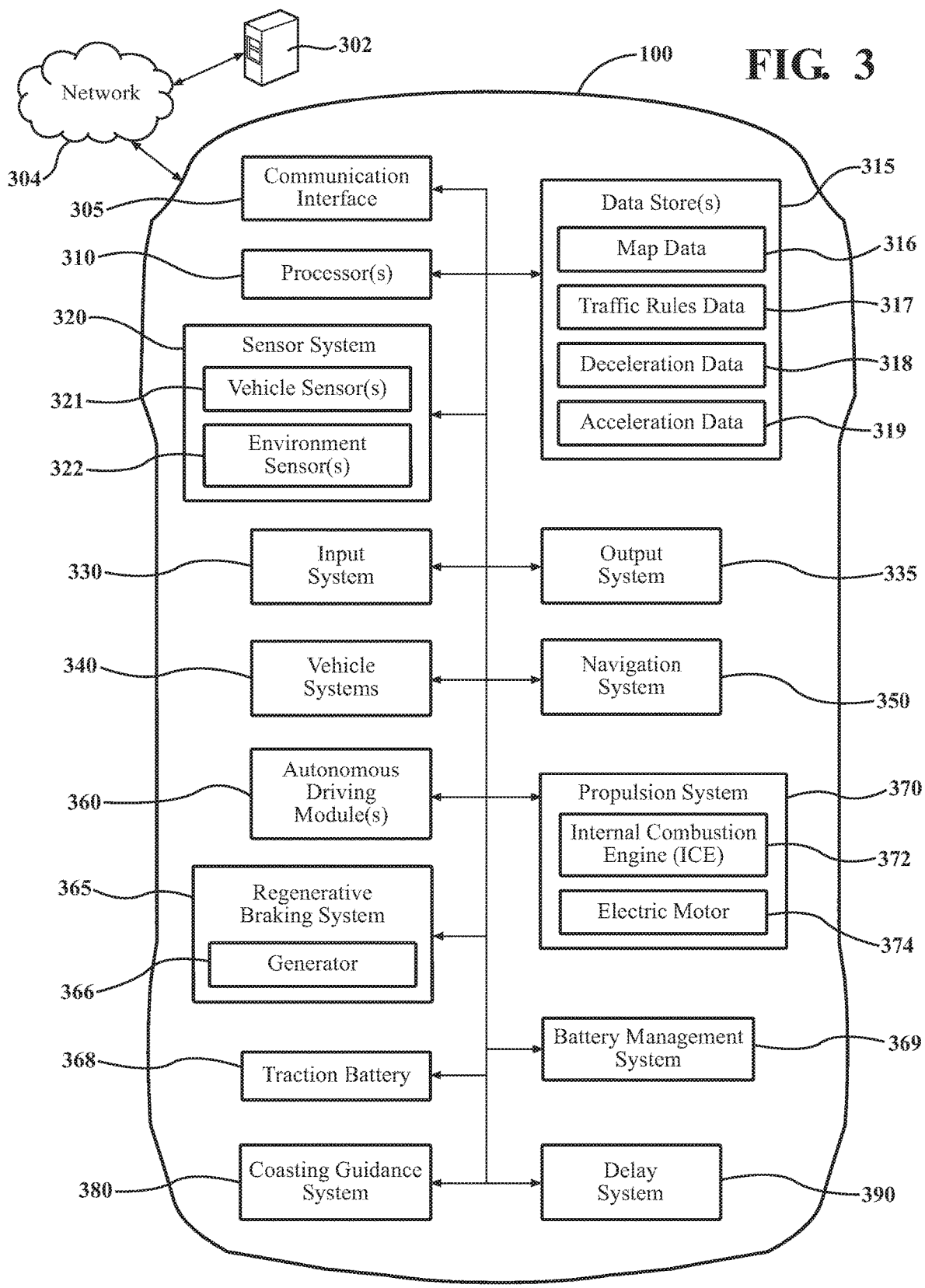
FIG. 3 illustrates an example of a hybrid vehicle that includes a delay system.

FIG. 3 is an example of the hybrid vehicle 100 that includes a delay system 390. As introduced above and set forth below, the delay system 390 is implemented to perform methods and other functions as disclosed herein for delaying the start of the internal combustion engine for improved fuel economy. As used herein, a "hybrid vehicle" is any form of electrified motorized transport that includes the internal combustion engine and an electric machine, as set forth below. In one or more implementations, the hybrid vehicle 100 is an automobile, for example, a hybrid electric vehicle ("HEV"), a plug-in hybrid vehicle ("PHEV"), an extended range electric vehicle ("EREV"), etc. While arrangements will be described herein with respect to automobiles, it will be understood that embodiments are not limited to automobiles. In some implementations, the hybrid vehicle 100 may be any other form of electrified motorized transport that, for example, benefits from the systems and methods as discussed herein.

The hybrid vehicle 100 also includes various elements. It will be understood that in various embodiments it may not be necessary for the hybrid vehicle 100 to have all the elements shown in FIG. 3. The hybrid vehicle 100 can have any combination of the various elements shown in FIG. 3. Further, the hybrid vehicle 100 can have additional elements to those shown in FIG. 3. In some arrangements, the hybrid vehicle 100 is be implemented without one or more of the elements shown in FIG. 3. Further, while the various elements are shown as being located within the hybrid vehicle 100 in FIG. 3, it will be understood that one or more of these elements can be located external to the hybrid vehicle 100. Further, the elements shown may be physically separated by large distances.

Some of the possible elements of the hybrid vehicle 100 are shown in FIG. 3 and will be described along with subsequent figures. However, a description of many of the elements in FIG. 3 will be provided after the discussion of FIGS. 4-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The hybrid vehicle 100 can include a regenerative braking system 365. The regenerative braking system 365 can include a generator 366 and/or an electric machine operating as the generator 366, a traction battery 368 and a battery management system ("BMS 369"). The generator 366 may be coupled to the traction battery 368 and converts the kinetic energy from the hybrid vehicle 100 back into electrical energy that may be stored by the traction battery 368, i.e., a regenerative braking function. The regenerative braking function may be used to slow or stop the hybrid vehicle 100, and as set forth above may be referred to as a regenerative braking event. The regenerative braking event may be used with the energy dissipation brakes, such as hydraulic brakes or friction brakes, to stop the hybrid vehicle 100. Additionally, an internal combustion engine 372, hereinafter referred to as the "ICE 372," may be coupled to the generator 366 and combusts fuel to provide power instead of and/or in addition to the generator 366.

The traction battery 368 may be coupled to an electric motor 374 and/or the generator 366 and may provide electrical energy to and receive electrical energy from the electric motor 374 and/or the generator 366. The traction battery 368 may include one or more rechargeable batteries. The actual energy value described above generated during the regenerative braking event 110 is stored in the traction battery 368.

The BMS 369 may be coupled to the traction battery 368 and control and manage the charging and discharging of the traction battery 368. The BMS 369, for example, may measure, using traction battery 368 sensors (not shown), parameters used to determine the state of charge ("SOC") of the traction battery 368.

The hybrid vehicle 100 can include a propulsion system 370. The propulsion system 370 can include the ICE 372, the electric motor 374 and/or the electric machine operating as the electric motor 374, the traction battery 368 and the BMS 369. The propulsion system 370 may provide the motive force necessary to propel the hybrid vehicle 100 as a result of the driver power demand. The electric motor 374 may be coupled to the traction battery 368 and converts electrical energy from the traction battery 368 into mechanical power, such as torque, that may be applied to propel the hybrid vehicle 100. The hybrid vehicle 100 may include one or more additional power generation devices, such as the ICE 372. The ICE 372 may be coupled to the electric motor 374 and combusts fuel to provide power instead of and/or in addition to the electric motor 374.

The hybrid vehicle 100 can include a coasting guidance system 380, as introduced above. The coasting guidance system 380 can be configured to perform various functions. As an example, the coasting guidance system 380 can be configured to acquire and/or analyze data relating to decelerations of the hybrid vehicle 100. The data can include speed, acceleration/deceleration, pedal position, accelerator off, accelerator off speed, location, deceleration distance, etc. The coasting guidance system 380 can receive and/or acquire data from a navigation system 350, a sensor system 320, data store(s) 315, and/or any other source of information relating to the hybrid vehicle 100 and/or the external environment of the hybrid vehicle 100.

The coasting guidance system 380 can be configured to learn deceleration areas encountered by the hybrid vehicle 100. For instance, after the hybrid vehicle 100 decelerates in the same or substantially the same area for a predetermined minimum number of times, a threshold number of times, and/or a statistically significant number of times, the coasting guidance system 380 can be configured to learn that the area is a deceleration area. The predetermined minimum number of times, the threshold number of times, and/or the statistically significant number of times can be established by a vehicle manufacturer or some other entity. The coasting guidance system 380 can be configured to learn the vehicle's deceleration profiles in such areas. The coasting guidance system 380 can be configured to determine a target deceleration pattern from a current vehicle location to a target stop position, for example, the stopping location 120, in the deceleration area. The coasting guidance system 380 can assist a vehicle driver in decelerating the vehicle 100 on the basis of the deceleration pattern. For example, the coasting guidance system 380 can be configured to coach a driver in efficiently coasting and/or braking to achieve the deceleration pattern. Furthermore, as set forth above, for example, the coasting guidance system 380 may adjust the deceleration drive force such that the hybrid vehicle 100 reaches the optimal braking location 130 at the optimal velocity to maximize the energy captured by the regenerative braking system 365. As set forth below, the delay system 390 utilizes information from the coasting guidance system 380 to determine the appropriate energy savings value 150 and subsequent delay of the start of the ICE 372.

Figure 4:
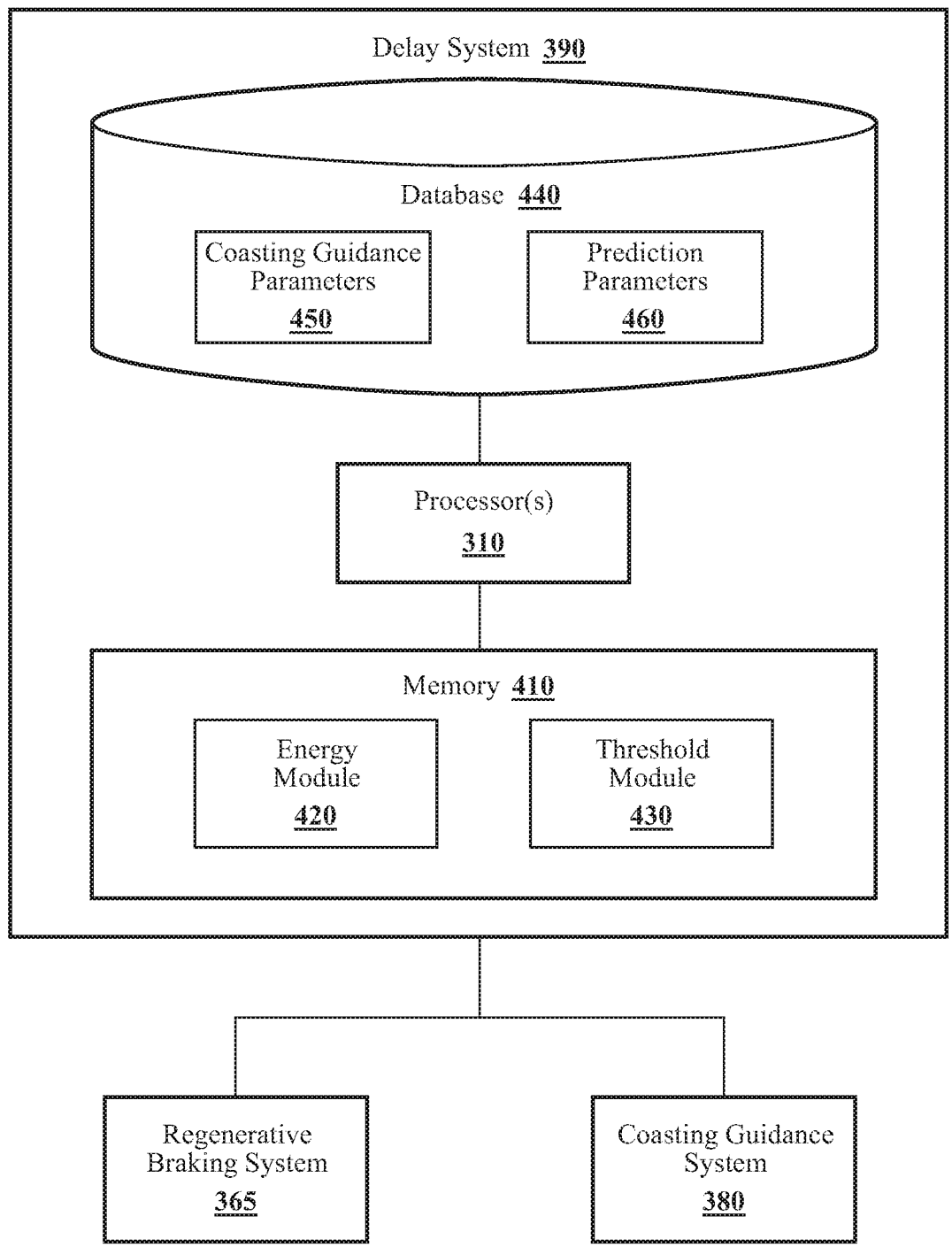
FIG. 4 is a schematic of the delay system according to one or more embodiments.

With reference to FIG. 4, one embodiment of the delay system 390 of FIG. 3 is further illustrated. The delay system 390 is shown as including a processor 310 from the hybrid vehicle 100 of FIG. 3. Accordingly, the processor 310 may be a part of the delay system 390, the delay system 390 may include a separate processor from the processor 310 of the hybrid vehicle 100 or the delay system 390 may access the processor 310 through a data bus or another communication path. Although the delay system 390 is illustrated as a sub-component of the hybrid vehicle 100, in various embodiments, the delay system 390 is integrated with the coasting guidance system 380. In either case, the processor 310 is illustrated as part of the delay system 390 for purposes of explanation.

Additionally, in one embodiment, the delay system 390 includes a memory 410 that stores an energy module 420 and a threshold module 430. The memory 410 is a random-access memory (RAM), read-only memory (ROM), a hard-disk drive, a flash memory, or other suitable memory for storing the energy module 420 and the threshold module 430. The energy module 420 and the threshold module 430 are, for example, computer-readable instructions that when executed by the processor 310, cause the processor 310 to perform the various functions disclosed herein.

The delay system 390 includes database 440. The database 440 is, for example, an electronic data structure stored in the memory 410 or another electronic database that is configured with routines that can be executed by the processor 310 for analyzing stored data, providing store data, organizing stored data, and so on. Thus, in one embodiment, the database 440 store data used/provided by the energy module 420 and the threshold module 430 in executing various functions, as set forth below.

The energy module 420, in one embodiment, includes instructions that function to control the processor 310 to identify the stopping location 120 for the hybrid vehicle 100. The stopping location 120 can be determined by the coasting guidance system 380 and is made available to the energy module 420 via the one or more communication networks described above. The identification of the stopping location 120 indicates to the energy module 420 that the coasting guidance system 380 may initiate a notification to the driver of an ideal coasting location in preparation for the regenerative braking event 110. The coasting guidance system 380 may determine the stopping location by, for example, detecting a stop sign, a traffic signal, a traffic standstill (e.g., at an accident location, at a traffic jam, etc.), etc., using the navigation system 350, one or more sensors from the sensor system 320, one or more external databases accessed through the server 302 via the communication interface 305, etc. In some instances, the coasting guidance system 380 may determine the stopping location 120 based on a stored location of a previous stopping location that is associated with the current stopping location 120, i.e., historical stopping data. Furthermore, the historical stopping data may be stored in a database, e.g., the database 440, the coasting guidance parameters 450 database, etc., and based on an individual driver's stopping habits. The coasting guidance system 380 may use the speed of the vehicle to further indicate or enhance the determination that the hybrid vehicle 100 is stopping at the stopping location 120. In any event, the energy module 420 identifies the stopping location 120 as determined by the coasting guidance system 380 by, for example, periodically polling the coasting guidance system 380 for updated stopping locations 120, receiving an update signal indicating the stopping location 120 from the coasting guidance system 380, etc. Upon identifying the stopping location 120, the energy module 420 may store the stopping location 120 in the coasting guidance parameters 450 database.

The energy module 420, in one embodiment, includes instructions to identify the regenerative braking event 110 for the hybrid vehicle 100. As set forth above and illustrated in FIG. 1C, the regenerative braking event 110 is a regenerative function along a braking profile that includes a driver notification at the ideal coasting location 125, the actual coasting location 135 where the accelerator pedal is released, the optimal braking location 130 where the brake pedal may be depressed and the stopping location 120. The regenerative braking event 110 assists in stopping the hybrid vehicle 100 at the stopping location 120. The coasting guidance system 380 maximizes the regenerative braking energy captured during the regenerative braking event 110 by compensating for the driver's delayed response time. Adjustment to the deceleration drive force may be performed by the coasting guidance system 380 so that the hybrid vehicle 100 reaches the optimal braking location 130 at the optimal velocity. In some instances, the ideal and actual coasting locations 125, 135 may be the same. Furthermore, the optimal braking location 130 and the stopping location 120 may be the same, for example, when the optimal velocity is zero.

The coasting guidance system 380 may determine the optimal braking location 130 and the optimum velocity at the optimal braking location 130 based on the stopping location 120. The optimal braking location 130 and the associated optimal velocity serve at least two purposes. First, they maximize the amount of regenerative braking energy that can be captured while the energy dissipation brakes are engaged to assist the regenerative function in stopping the vehicle 100 between the optimal braking location 130 and the stopping location 120. Second, they are used to determine the ideal coasting location 125 to notify the driver where to begin to coast, which maximizes the amount of regenerative braking energy that can be captured between the ideal coasting location 125 and the optimal braking location 130. The optimal velocity and/or the optimal braking location 130 may be based on an approach speed determined from statistical analysis of driver behavior patterns associated with, for example, eco-braking and/or other suitable driver braking profiles. The optimal velocity may be in a range of 5-8 mph, for example. The coasting guidance system 380 may use historical braking locations that were retrieved from the coasting guidance parameters 450 database as detected from, for example, the navigation system 350, one or more sensors from the sensor system 320, etc. The optimal braking location 130 may be based on a specific deceleration rate, e.g., a constant deceleration rate, in which the hybrid vehicle 100 maintains regenerative braking. The optimal braking location 130 may be estimated by a function derived from empirical testing. In some arrangements, the coasting guidance system 380 determines the optimal braking location 130 and the optimal velocity further based on a road condition, such a road-grade level, and/or the road-load using known hybrid vehicle 100 dynamics.

The coasting guidance system 380 may determine the ideal coasting location 125 by calculating the distance needed for the hybrid vehicle 100 to decelerate using a predetermined deceleration drive force to reach the optimal velocity at the optimal braking location 130. The predetermined deceleration drive force may be based on, for example, a deceleration map stored in the coasting guidance parameters 450 database and the current speed of the hybrid vehicle 100. The coasting guidance system 380 may control the deceleration drive force to coast from the actual coasting location 135 to the optimal braking location 130 and decelerate to the optimal velocity from a current speed. By controlling the deceleration drive force, the coasting guidance system 380 compensates for the difference between the actual coasting location 135 and the ideal coasting location 125.

When identifying the regenerative braking event 110, the energy module 420 may communicate with the coasting guidance system 380, as set forth above, and receive, for example, the ideal and actual coasting locations 125, 135, the current speed of the hybrid vehicle 100 prior to coasting, the optimal braking location 130 and the optimal velocity. The energy module 420 may store these parameters in the coasting guidance parameters 450 database for later use when determining an estimated energy value based the predicted braking event 115.

The coasting guidance system 380 may be in communication with one or more autonomous driving modules 360 of the hybrid vehicle 100. In this case, when the hybrid vehicle 100 is in an autonomous mode, the coasting guidance system 380 may communicate the ideal coasting location 125 and the optimal braking location 130 to the autonomous driving module(s) 360. Accordingly, the autonomous driving module(s) 360 may instruct the appropriate vehicle systems 340 to release the accelerator pedal at the ideal coasting location 125 and apply the energy dissipating brakes at the optimal braking location 130. Therefore, when the hybrid vehicle 100 is in autonomous mode, the ideal coasting location 125 may be the same as the actual coasting location 135.

The energy module 420, in one embodiment, includes instructions to identify an actual energy value based on the regenerative braking energy generated during the regenerative braking event. The coasting guidance system 380 may determine the actual energy captured during the regenerative braking event 110. The coasting guidance system 380 may communicate with the regenerative braking system 365 and determine the actual energy. For example, the voltage and current entering the traction battery 368 during the regenerative braking event may be monitored by the coasting guidance system 380 and/or the regenerative braking system 365 to determine the actual energy. The actual energy captured during the regenerative braking event 110 may be determined using any suitable method for calculating the actual energy. Alternatively, the energy module 420 may identify the actual energy by communicating with the coasting guidance system 380 and/or the regenerative braking system 365 to determine the actual energy. The energy module 420 may retrieve the parameters stored in the coasting guidance parameters 450 database for the actual energy determination. Upon identifying the actual energy, the energy module 420 may store the actual energy in the coasting guidance parameters 450 database.

The energy module 420, in one embodiment, includes instructions to determine the estimated energy value based on a predicted regenerative braking energy from the predicted braking event 115 (FIG. 1C) causing the hybrid vehicle 100 to stop at the stopping location 120. As set forth above and illustrated in FIG. 1C, the predicted braking event 115 is a regenerative function along a predicted braking profile that includes the predicted coasting location 140, the predicted braking location 145 and the stopping location 120. The energy module 420 determines the predicted coasting location 140 and the predicted braking location 145, in one arrangement, based on user braking data.

The predicted braking event 115 is a braking event that does not use the coasting guidance system 380. For example, the coasting guidance system 380 may be turned off by the driver, ignored by the driver, etc. The predicted braking event 115 is considered a typical braking event, based on user data as described below, that uses regenerative braking to assist in stopping the hybrid vehicle 100 at the same stopping location 120. The predicted braking event may utilize the energy dissipation brakes. In some cases, the predicted braking location 145 and a predicted speed associated with the predicted braking location 145 may be at the same location and speed as the optimal braking location 130 and the optimal velocity. In rare cases, portions of the predicted braking event 115 may lie below the regenerative braking event 110 along the distance spectrum leading up to the stopping location 120. In these rare cases, the energy module 420 may disregard the portions when determining the estimated energy value, or the energy module 420 may abandon the determination of the estimated energy value. In the case of abandonment, the energy module 420 may set the estimated energy value equal to the actual energy value, which results in zero energy savings for the regenerative braking event 110 associated with the current stopping location 120.

The user braking data utilized to predict the predicted braking location 145, i.e. the location and speed at which the brake pedal is depressed, may be based on statistical analysis of driver behavior patterns associated with, for example, eco-braking and/or other suitable driver braking profiles. In other arrangements, the user braking data is based on historical stopping data when the coasting guidance system 380 is not in use as detected from, for example, the navigation system 350, one or more sensors from the sensor system 320, etc. In this case, the predicted braking locations 145 and associated speeds may be stored in the prediction parameters 460 database for the individual driver's braking habits when the coasting guidance system 380 is not being used. The predicted braking location 145 may be based on a specific deceleration rate, e.g., a constant deceleration rate, in which the hybrid vehicle 100 maintains regenerative braking without the assistance of the coasting guidance system 380. The predicted braking location 145 may be estimated by a function derived from empirical testing. In some arrangements, the energy module 420 determines the predicted braking location 145 and the associated speed based on a road condition, such a road-grade level, and/or the road-load using known hybrid vehicle 100 dynamics.

The user braking data utilized to predict the predicted coasting location 140 may be derived in the same manner as the predicted braking location 145 when the coasting guidance system 380 is not used. For example, the predicted coasting location 140 may be based on statistical analysis, stored historical locations where the accelerator pedal is released, specific deceleration rates (e.g., constant deceleration rate), empirical testing, etc. The energy module 420 may determine the predicted coasting location 140 by calculating the distance needed for the hybrid vehicle 100 to decelerate using a predicted deceleration drive force to reach the predicted braking location 145 at the associated speed. The predicted deceleration drive force may be based on, for example, a deceleration map stored in the prediction parameters 460 database and the predicted speed of the hybrid vehicle 100 when the driver releases the accelerator pedal.

The energy module 420, in one embodiment, determines the estimated energy value based on the predicted regenerative braking energy from the predicted braking event 115. The energy module 420 may use the current speed of the hybrid vehicle 100 prior to coasting that was utilized by the coasting guidance system 380 and the predicted speed at the predicted braking location 145. The energy module 420 may use a constant deceleration rate between predicted coasting location 140 and the predicted braking location 145, a constant deceleration rate between the predicted braking location 145 and the stopping location 120 and the hybrid vehicle 100 dynamics, e.g., mass of the hybrid vehicle 100, etc. The energy module 420 may incorporate the road-grade level, and/or the road-load into the estimated energy value. The energy module 420 may determine the estimated energy value using any suitable method for calculating the predicted braking energy.

The energy module 420, in one embodiment, includes instructions to determine the energy savings value 150, which is based, at least in part, on a difference between the actual energy value and the estimated energy value. The energy savings value 150 may be greater than or equal to zero and is determined by subtracting the estimated energy from the actual energy. The energy module 420 may rerate the energy savings value 150 based on other factors, such as temperature of the traction battery 368, the SOC of the traction battery 368, etc. For example, the user braking data may have been derived at nominal battery temperatures and the energy module 420 may decrease the determined energy savings value 150 at higher battery temperatures to compensate for battery charging deficiencies at higher temperatures. The amount that the energy saving value 150 is rerated may be determined experimentally. With increased accuracy of the estimated energy savings, the estimated fuel economy savings from the delay of the start of the ICE 372 becomes more precise. The energy module 420 may store the energy savings value 150 in the database 440.

It should be noted that a complete stop at the stopping location 120 may not be necessary for the energy savings value 150 to be determined by the energy module 420. For example, the hybrid vehicle 100 may perform a low-speed "rolling stop" where the ICE 372 turns off and hybrid vehicle 100 doesn't actually come to a complete stop at the stopping location 120 before the accelerator pedal is depressed again. In this case, the energy module 420 may compensate by adjusting the estimated energy value, which in turn adjusts the energy savings value 150. The energy module 420 may determine that the speed of the hybrid vehicle 100 is too high when the stop was aborted during the regenerative braking event 110 and reset the energy saving value 150 to zero if the ICE 372 turned off in anticipation of a future regenerative braking event 110.

The threshold module 430, in one embodiment, includes instructions that function to control the processor 310 to determine whether the ICE 372 is off. The threshold module 430 may receive an engine off signal via the communication network from, for example, the propulsion system 370, one or more modules in the hybrid vehicle 100, etc.

The threshold module 430, in one embodiment, includes instructions to delay, responsive to the ICE 372 being off, the start of the ICE 372 based, at least in part, on the energy savings value 150 and a driver power demand. More specifically, the threshold module 430, in one embodiment, includes instructions that calculate a driver energy demand 210 from the driver power demand for a region above the engine start threshold 205 when the ICE 372 is off and the driver power demand exceeds the engine start threshold 205. For example, as set forth above in FIGS. 2A-2B, the driver energy demand 210 is an energy demand that is derived by the threshold module 430 from the portion of the current power demand profile starting at a time $T_1$ when the profile exceeds the engine start threshold 205. In one arrangement, the driver energy demand 210 is the area under the current power demand profile that lies above the engine start threshold 205, as shown in the shaded regions in FIGS. 2A and 2B. For example, an overall driver energy demand may be defined as the integral of the current power demand profile for a time period starting at t=0. The driver energy demand 210 is a subset of the overall driver energy demand that includes the shaded regions of FIGS. 2A-2B. In other words, in one or more arrangements, the driver energy demand 210 is the area under the current power demand profile curve starting at the time $T_1$ and is continuously calculated by the threshold module 430 over time as the power demand profile remains above energy demand profile. To isolate the driver energy demand 210 specifically to the shaded regions, the area below the engine start threshold 205, i.e., a driver energy demand 225, is continuously subtracted out of the continuous calculation.

The threshold module 430 may store the driver energy demand 210 as it is being calculated in the database 440. As set forth below, it is the driver energy demand 210 that can be compared to the energy savings value 150 to determine the delay duration of the start of the ICE 372. Alternatively, the driver energy demand 210 may be continuously calculated using any suitable iterative numerical method that isolates a driver energy demand above the engine start threshold 205.

Before discussing the conditions that affect the delay of the start of the ICE 372, the engine start threshold 205, the cut-off time $T_C$ and the residual energy value will be further discussed. The engine start threshold 205, as set forth above, is a driver power demand threshold that, when exceeded, the ICE 372 would ordinarily be started. The delay system 390, as described herein, modifies the engine start threshold 205 to delay the start of the ICE 372 in one or more arrangements. For example, as shown in FIG. 2A, the engine start threshold 205 is increased to the modified engine start threshold 215. The engine start threshold 215 may be dynamic and may increase or decrease based on the SOC of the traction battery 368, discharge limits, and/or other factors associated with the vehicle systems 340. The threshold module 430 may determine the engine start threshold 205. The engine start threshold 205 may be determined by, for example, the propulsion system 370, one or more modules of the hybrid vehicle 100, etc.

The cut-off time Tc is the maximum time the ICE 372 may be off for the current engine start cycle. The threshold module 430, in one embodiment, determines the cut-off time Tc based on a battery discharge limit. The battery discharge limit corresponds to a maximum power deliverable by the traction battery 368 at current operating conditions. The current operating conditions may include the current SOC of the traction battery 368, accessory power draw, and inherent system discharge limits. The battery discharge limit may include a reservoir of energy to ensure that sufficient battery discharge capacity is reserved to start the engine if necessary and to anticipate aggressive acceleration events. In one arrangement, the cut-off time Tc may be stored in and obtained from a lookup table that resides in the database 440. As shown in FIG. 2B, the cut-off time Tc is offset later in time from the time $T_1$. The threshold module 430 may compensate for when a power demand profile oscillates above and below the engine start threshold 205.

The residual energy value is determined from how much energy is "left over" from the current power demand profile at the point in time when the cut-off time Tc is asserted, i.e., when the ICE 372 is started due to the cut-off time Tc being exceeded. In other words, the threshold module 430, in one or more arrangements, responsive to the driver energy demand 210 being less than the energy savings value 150 and the cut-off time Tc being exceeded, calculates the residual energy value by subtracting the driver energy demand 210 from the energy savings value 150. As set forth below, the residual energy value, which is greater than zero, is applied to the delay of the start of the ICE 372 before any additional energy savings value 150 from subsequent regenerative braking events 110 is applied. The threshold module 430 may store the residual energy value in the database 440 and may reset the residual energy value to zero when the cut-off time Tc is not exceeded.

The threshold module 430, in one embodiment, includes instructions to reset, responsive to the driver energy demand 210 being less than the energy savings value 150 and the cut-off time $T_C$ not being exceed, the residual energy value to zero and delay the start of the ICE 372. An example of this condition can be demonstrated in FIG. 2A. The start of the ICE 372 is delayed when the driver energy demand 210 is less than the energy savings value 150, i.e. when a time is less than $T_2$. This condition does not trigger the calculation of the residual energy value, for the cut-off time $T_C$ is not exceeded. Therefore, the residual energy value is held to zero by the threshold module 430.

The threshold module 430, in one embodiment, includes instructions to reset, responsive to the driver energy demand 210 being equal to the energy savings value 150, the driver energy demand 210 to zero, reset the residual energy value to zero and start the ICE 372. An example of this condition can also be demonstrated in FIG. 2A. When the driver energy demand 210 increases to the point of equaling the energy savings value 150, the energy savings value 150 is "used up" and the threshold module 430 starts the ICE 372 at the modified engine start threshold 215. The threshold module 430 resets the driver energy demand 210 to zero to prepare the delay system 390 for another engine start cycle. This condition does not trigger the calculation of the residual energy value, for the cut-off time $T_C$ is not exceeded. Therefore, the residual energy value is held to zero by the threshold module 430.

The threshold module 430, in one embodiment, includes instructions to reset, responsive to the driver energy demand 210 being less than the energy savings value 150 and the cut-off time Tc being exceeded, the driver energy demand 210 to zero, calculate the residual energy value by subtracting the driver energy demand 210 from the energy savings value 150, and start the ICE 372. An example of this condition can be demonstrated in FIG. 2B. The driver energy demand 210 lingers above the engine start threshold 205, but doesn't exceed or become equal to the energy savings value 150. In this case, the cut-out time Tc takes over and is asserted, which results in the threshold module 430 starting the ICE 372. There is a portion of the energy savings value 150 "left over" because the ICE 372 was started before all of the energy savings value 150 was expended. The threshold module 430 may store the portion of the energy savings value 150, i.e., the residual energy value, which is the difference between the energy savings value 150 and the driver energy demand 210, in the database 440. The threshold module 430 resets the driver energy demand 210 to zero to prepare the delay system 390 for another engine start cycle.

Figure 6:
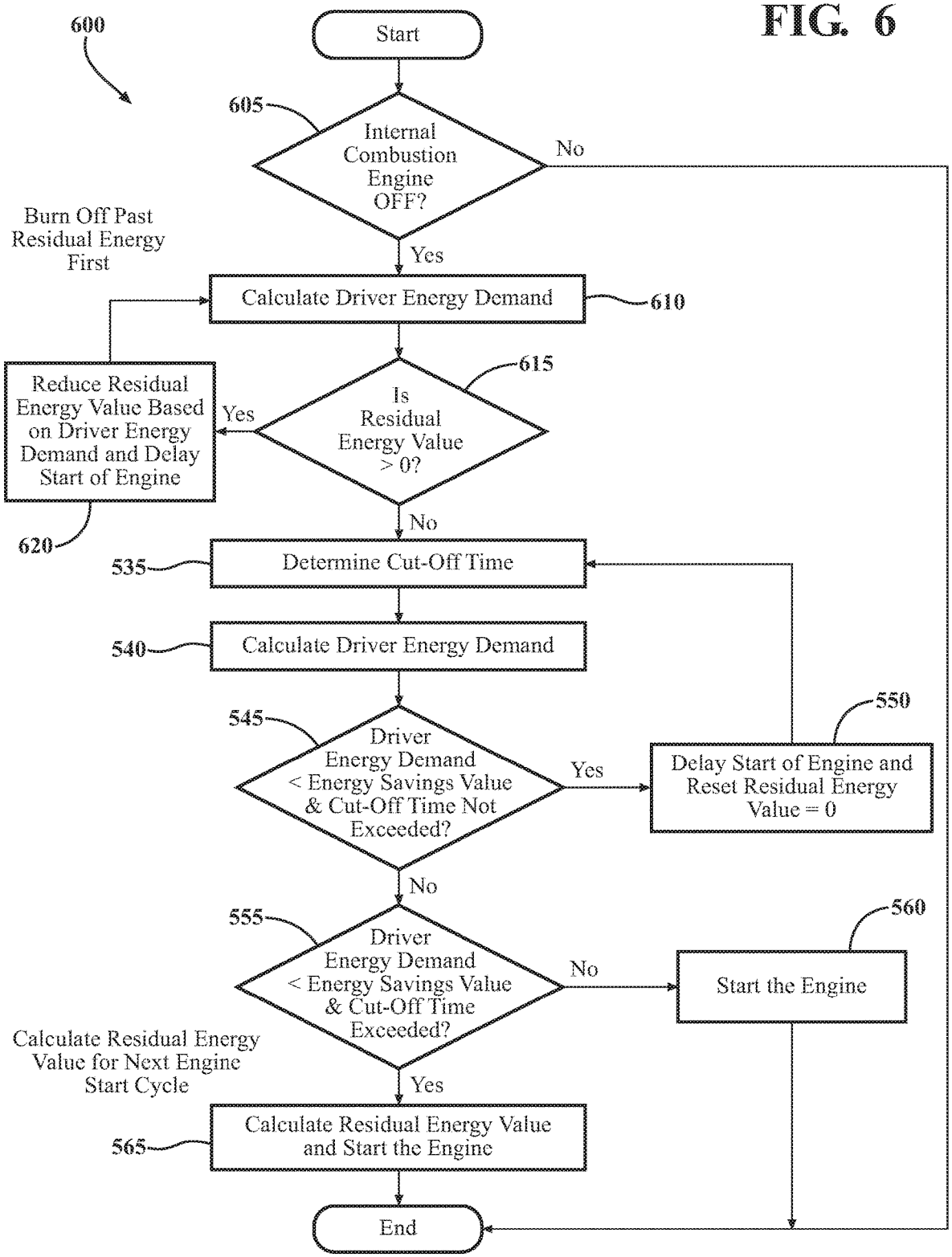
FIG. 6 illustrates one embodiment of a flowchart of a method for delaying the start of an internal combustion engine based on a residual energy value.

The threshold module 430, in one embodiment, includes instructions to reduce, responsive to the residual energy being greater than zero and the driver power demand exceeding the engine start threshold, the residual energy value based the driver demand energy and delay the start of the ICE 372. The residual energy value may be applied to the delay of the start of the ICE 372 on subsequent engine start cycles. This condition is best illustrated in the flowchart of FIG. 6 below. The next engine start cycle may be another regenerative braking event 110 where an additional energy savings value 150 is captured. Alternatively, a stopping event may occur without the use of coasting guidance where the engine is turned off. Further, stop and go traffic may cause the engine to turn off. In any event, the residual energy may be applied in the form of a delay to the next engine start cycle regardless of how the ICE 372 transitioned from running to an off condition. As the driver energy demand 210 increases over time starting at the time $T_1$, it can be incrementally subtracted from the residual energy value, which reduces the residual energy value. During this time, the threshold module 430 delays the start of the ICE 372. When the residual energy is depleted to zero, the conditions set forth above apply and the threshold module 430 may start the ICE 372.

Figure 5:
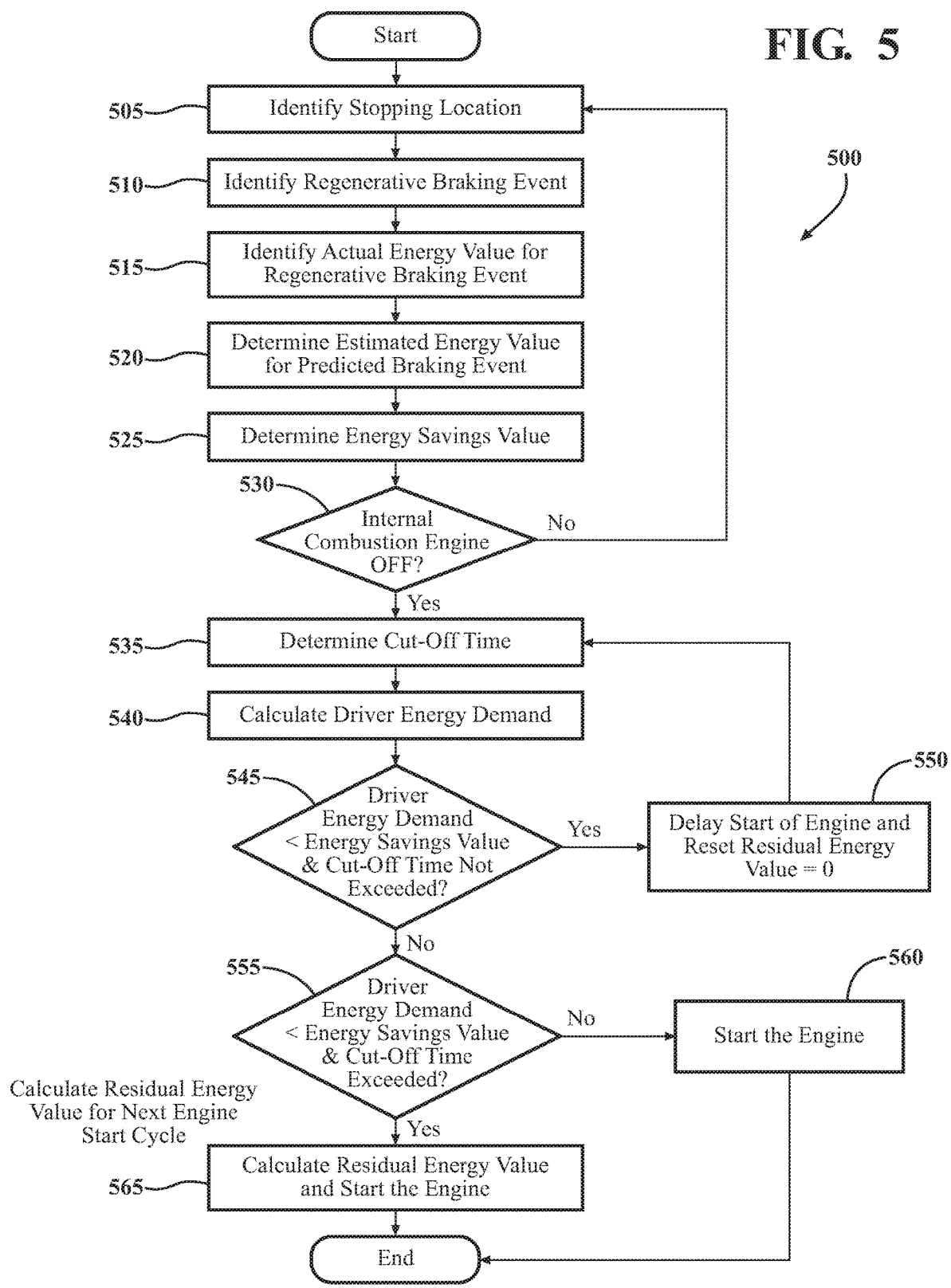
FIG. 5 illustrates one embodiment of a flowchart of a method for determining and applying an energy savings value to delay a start of an internal combustion engine.

FIG. 5 illustrates one embodiment of a flowchart of a method 500 for determining and applying the energy savings value 150 to delay the start of the ICE 372. The method 500 assumes that there is no residual energy value to be applied to the delay and that the ICE 372 turns off as a result of the regenerative braking event 110 that assists in stopping the hybrid vehicle 100 at the stopping location 120. The method 500 will be discussed from the perspective of delay system 390 of FIGS. 3-4. While the method 500 is discussed in combination with the delay system 390, it should be understood that the method 500 is not limited to being implemented within the delay system 390, but is instead one example of a system that may implement the method 500. The steps that are illustrated herein as part of the method 500 are not limited to this particular chronological order. Indeed, some of the steps may be performed in a different order than what is shown and/or at least some of the steps shown can occur simultaneously.

At block 505, the energy module 420 identifies the stopping location 120 as determined by the coasting guidance system 380. The energy module 420 may poll the coasting guidance system 380 for the stopping location 120, receive an update signal indicating the stopping location 120 from the coasting guidance system 380, etc., to identify the stopping location 120. The stopping location 120 may include a stop sign, a traffic signal, a traffic standstill, etc. The coasting guidance system 380 may detect these key stopping indicators using the navigation system 350, sensor system 320, external databases accessed through the server 302 via the communication interface 305, etc. As set forth above, the energy module 420 may identify a rolling stop and determine whether to abort the stopping location 120. Once the stopping location 120 is identified, the method 500 proceeds to block 510.

At block 510, the energy module 420 identifies the regenerative braking event 110. The coasting guidance system 380 determines ideal coasting location 125, the actual coasting locations 135, the current speed of the hybrid vehicle 100 prior to coasting, the optimal braking location 130 and the optimal velocity. The energy module 420 may communicate with the coasting guidance system 380 and receive these parameters by polling, receiving an update signal indicating these updated parameters from the coasting guidance system 380, etc. The energy module 420 may store these identified parameters in the coasting guidance parameters 450 database for later use when determining an estimated energy value based the predicted braking event 115. Once the regenerative braking event 110 is identified, the method 500 proceeds to block 515.

At block 515, the energy module 420 identifies the actual energy value for the regenerative braking event 110. The coasting guidance system 380 may determine the actual energy captured during the regenerative braking event 110. The energy module 420 may communicate utilizing the same methods above to receive and identify the actual energy. The energy module 420 may identify the actual energy by communicating with the coasting guidance system 380 and/or the regenerative braking system 365 to determine the actual energy. The actual energy may be determined from the voltage and the current entering the traction battery 368 over the period of the regenerative braking event 110. Upon identifying the actual energy, the energy module 420 may store the actual energy in the coasting guidance parameters 450 database and the method 500 proceeds to block 520.

At block 520, the energy module 420 determines the estimated energy for the predicted braking event 115 for the same stopping location 120. User braking data may be used to predict the predicted braking location 145 and the predicted coasting location 140. The energy module 420 may use the current speed of the hybrid vehicle 100 prior to coasting that was utilized by the coasting guidance system 380. The energy module 420 may use constant deceleration rates between the predicted coasting and braking locations 140, 145 and between the predicted braking location 145 and the stopping location 120. The energy module 420 may determine the estimated energy value using any suitable method for calculating the predicted braking energy. Once the estimated energy is determined, the method 500 proceeds to block 525.

At block 525, the energy module 420 determines the energy savings value 150. The energy savings value 150 is typically greater than or equal to zero because there is more regenerative energy captured during the regenerative braking event 110. The energy savings value 150 is determined by subtracting the estimated energy from the actual energy. The energy module 420 may rerate the energy savings value 150 due to nominal values being used while capturing the user braking data. The energy module 420 may store the energy savings value 150 in the database 440. Once the energy savings value 150 is determined, the method 500 proceeds to block 530.

At block 530, the threshold module 430 determines whether the ICE 372 is off. The threshold module 430 may receive an engine off signal via the communication network from, for example, the propulsion system 370, one or more modules in the hybrid vehicle 100, etc. If the ICE 372 is not off by the time the regenerative braking event 110 assists in stopping the hybrid vehicle 100 at the stopping location 120, the threshold module 430 may reset the energy savings value 150 to zero and the method 500 may proceed back to block 505 to attempt to identify a subsequent stopping location. Otherwise, the method 500 proceeds to block 535.

At block 535, the threshold module 430 determines the cut-off time Tc based on the battery discharge limit, as set forth above. The cut-off time Tc is the maximum amount of time the start of the ICE 372 is delayed. The threshold module 430 may take into account if the power demand profile oscillates about the engine start threshold 205. Depending upon how the driver energy demand 210 and the energy savings value 150 compare during the current power demand profile, there may be residual energy "left over" if the cut-off time Tc is reached, as described below. Once the cut-off time Tc is determined, the method 500 proceeds to block 540.

At block 540, the driver energy demand 210 is calculated from the driver power demand when the driver power demand is above the engine start threshold 205, as described above. Once the driver energy demand 210 is calculated for the current time after the time $T_1$, the method 500 proceeds to block 545.

At block 545, the threshold module 430 determines whether the driver energy demand 210 is less than the energy savings value 150 and whether the cut-off time Tc has not been exceeded. If for that current iteration the driver energy demand 210 is less than the energy savings value 150 and the cut-off time Tc has not been exceeded, then the method 500 proceeds to block 550 where the start of the ICE 372 is delayed. If either of these conditions are false, then the method 500 proceeds to block 555.

At block 550, the threshold module 430 delays the start of the ICE 372. This condition does not trigger the calculation of the residual energy value, for the cut-off time $T_C$ is not exceeded. Therefore, the residual energy value is reset to zero by the threshold module 430 and the method proceeds back to block 535 to redetermine the cut-off time Tc and recalculate the driver energy demand 210 once again.

At block 555, the threshold module 430 determines whether the driver energy demand 210 is less than the energy savings value 150 and whether the cut-off time Tc has been exceeded. If the driver energy demand 210 is less than the energy savings value 150 and the cut-off time Tc has been exceeded, then the method 500 proceeds to block 565 where the residual energy value is calculated, and the ICE 372 is started. Otherwise, then the method 500 proceeds to block 560 where the ICE 372 is started.

At block 560, the threshold module 430 starts the ICE 372. The threshold module 430 resets the driver energy demand 210 to zero to prepare the delay system 390 for another engine start cycle. This condition does not trigger the calculation of the residual energy value, for the cut-off time $T_C$ is not exceeded. Therefore, the residual energy value is held to zero by the threshold module 430. The method 500 then terminates.

At block 565, the threshold module 430 calculates the residual energy value by subtracting the driver energy demand 210 from the energy savings value 150 using the values for the driver energy demand 210 and the energy savings value 150 at the cut-off time Tc. The threshold module 430 may store the residual energy value in the database 440 for use with a subsequent engine start cycle. The threshold module 430 resets the driver energy demand 210 to zero to prepare the delay system 390 for another engine start cycle. The threshold module 430 starts the ICE 372 and the method 500 then terminates.

FIG. 6 illustrates one embodiment of a flowchart of a method 600 for delaying the start of the ICE 372 based on a residual energy value. The method 600 assumes a positive residual energy value stored in the database 440. Furthermore, an energy savings value 150 may be stored in the database 440. Alternatively, a stopping event may have occurred without the use of coasting guidance where the ICE 372 is turned off. Further, stop and go traffic may cause the ICE 372 to turn off. For these last two cases, the method 600 may be activated upon a stopping event and there may not be an energy savings value 150 stored in the database 440. The method 600 applies the residual energy value first to the delay of the start of the ICE 372 before any energy savings value 150 is applied. While the method 600 is discussed in combination with the delay system 390, it should be understood that the method 600 is not limited to being implemented within the delay system 390, but is instead one example of a system that may implement the method 600. Moreover, an in-depth discussion of blocks 535-565 will not be provided since the basic functionality associated with the noted blocks is discussed in relation to the method 500. Discussion of the method 600 will be focused on how the residual energy value delays the start of the ICE 372 and is "burned off" before the energy savings value 150, if any, is processed.

At block 605, the threshold module 430 determines whether the ICE 372 is off. The threshold module 430 may receive an engine off signal via the communication network from, for example, the propulsion system 370, one or more modules in the hybrid vehicle 100, etc. If the ICE 372 is not off, the method 600 terminates. Otherwise, the method 600 proceeds to block 610.

At block 610, the threshold module 430 calculates the driver energy demand 210, as described above. Once the driver energy demand 210 is calculated, the method 600 proceeds to block 615.

At block 615, for the initial time entering the block 615 there may be a residual energy value that is greater than zero stored in the database 440. If the threshold module 430 reads the residual energy value and determines that it is greater than zero, the method 600 proceeds to block 615. When the residual energy value is depleted to zero as described below, the method 600 proceeds to block 535 to process any energy savings value 150 that may be stored in the database 440 and the method 600 proceeds to blocks 535-565, as set forth above. The method 600 then terminates.

At block 620, the threshold module 430 reduces the residual energy value by the driver energy demand 210 when the driver energy demand 210 exceeds the engine start threshold 205. With every cycle in this first loop (blocks 610, 615, and 620), the threshold module 430 reduces the residual energy value by the driver energy demand 210 until the residual energy value is depleted to zero. During this loop, the threshold module 430 delays the start of the ICE 372. Once the residual energy value is reduced, the method 600 then proceeds back to block 610 to recalculate the driver energy demand 210.

FIG. 3 will now be discussed in full detail as an example environment within which the system and methods disclosed herein may operate. In some instances, the hybrid vehicle 100 is configured to switch selectively between an autonomous mode, one or more semi-autonomous operational modes, and/or a manual mode. Such switching can be implemented in a suitable manner, now known or later developed. "Manual mode" means that all of, or a majority of, the navigation and/or maneuvering of the vehicle is performed according to inputs received from a user (e.g., a human operator). In one or more arrangements, the hybrid vehicle 100 can be a conventional vehicle that is configured to operate in only a manual mode.

In one or more embodiments, the hybrid vehicle 100 is an autonomous vehicle. As used herein, "autonomous vehicle" refers to a vehicle that operates in an autonomous mode. "Autonomous mode" refers to navigating and/or maneuvering the hybrid vehicle 100 along a travel route using one or more computing systems to control the hybrid vehicle 100 with minimal or no input from a human operator. In one or more embodiments, the hybrid vehicle 100 is highly automated or completely automated. In one embodiment, the hybrid vehicle 100 is configured with one or more semi-autonomous operational modes in which one or more computing systems perform a portion of the navigation and/or maneuvering of the vehicle along a travel route, and a vehicle operator (i.e., operator) provides inputs to the vehicle to perform a portion of the navigation and/or maneuvering of the hybrid vehicle 100 along a travel route.

The various systems of the hybrid vehicle 100 can be communicatively linked through one or more communication networks. For example, the various systems can communicate with each other using a controller area network (CAN) bus or the like. Via the CAN bus and/or other wired or wireless mechanisms, the elements and/or systems described herein may transmit messages to various devices in the hybrid vehicle 100 and/or receive messages from the various devices, e.g., controllers, actuators, sensors, etc.

The hybrid vehicle 100 can be configured to operate via a communication interface 305 in a networked environment supporting connections to one or more remote computers for wireless communication between the hybrid vehicle 100 and a remote server 302. The elements and/or systems describe herein may function to control processor(s) 310 to transmit data to the remote server 302 via the communication interface 305 to request, for example, infrastructure information from one or more external databases. Further, the elements and/or systems may receive data from the remote server 302 via the communication interface 305, e.g., stop sign locations, traffic light state, etc.

The remote server 302 is a computer including a processor and a memory, the memory stores instructions which may be executed by the processor. The remote server 302 can communicate, via the network 304 with the elements and/or systems of the hybrid vehicle 100.

The network 304 represents one or more mechanisms by which the hybrid vehicle 100 and the remote server 302 may communicate with each other. The network 304 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The communication interface 305 may be configured to establish and enable continued and uninterrupted interaction between the hybrid vehicle 100 and external sensors, other vehicles, other computer systems, various external computing and communications systems and networks (such as a network 304, a satellite system, a cellular phone/wireless communication system), and also remote users or entities, to enable and/or facilitate performance of one or more of the functions described herein. The communication interface 305 may include interfaces enabling communication in a wide area network (WAN), a wireless telecommunications network, and/or any other suitable communications networks (such as or including the network 304, for example).

The hybrid vehicle 100 can include the one or more processors 310. "Processor" means any component or group of components that are configured to execute any of the processes described herein or any form of instructions to carry out such processes or cause such processes to be performed. The processor(s) 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 310 can include at least one hardware circuit (e.g., an integrated circuit) configured to carry out instructions contained in program code. In arrangements in which there is a plurality of processors 310, such processors can work independently from each other or one or more processors can work in combination with each other. In one or more arrangements, the processor(s) 310 can be a main processor of the hybrid vehicle 100.

The hybrid vehicle 100 can include one or more data stores 315 for storing one or more types of data. The data store 315 can include volatile and/or non-volatile memory. Examples of suitable data stores 315 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 315 can be a component of the processor(s) 310, or the data store 315 can be operatively connected to the processor(s) 310 for use thereby. The term "operatively connected," as used throughout this description, can include direct or indirect connections, including connections without direct physical contact.

In one or more arrangements, the one or more data stores 315 can include map data 316. The map data 316 can include maps of one or more geographic areas. In some instances, the map data 316 can include information or data on roads, traffic control devices, road markings, structures, features, and/or landmarks in the one or more geographic areas. The map data 316 may include real-time traffic signal information. The map data 316 can be in any suitable form. In some instances, the map data 316 can include aerial views of an area. In some instances, the map data 316 can include ground views of an area, including 360-degree ground views. The map data 316 can include measurements, dimensions, distances, and/or information for one or more items included in the map data 316 and/or relative to other items included in the map data 316. The map data 316 can include a digital map with information about road geometry. In one or more arrangement, the map data 316 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 316 can be high quality and/or highly detailed.

In one or more arrangements, the one or more data stores 315 can include traffic rules data 317. The traffic rules data 317 can include one or more traffic rules. As used herein, "traffic rule" is any law, rule, ordinance or authority that governs the operation of a motor vehicle, including instances, situations, and/or scenarios in which a motor vehicle is required to stop or reduce speed. The traffic rules data 317 can include speed limit data. The traffic rules data 317 can be international, federal, national, state, city, township and/or local laws, rules, ordinances and/or authorities.

In one or more arrangements, the one or more data stores 315 can include vehicle deceleration data 318. The vehicle deceleration data 318 can include data acquired by the sensor system 320 of the hybrid vehicle 100. The vehicle deceleration data 318 can include deceleration data with respect to learned and/or unlearned deceleration area(s), deceleration data from learned and/or unlearned stop(s), learned deceleration areas, learned stops, deceleration profiles, brake pedal data, accelerator pedal data, location data, temporal data, distance data, and/or any data associated with the deceleration or stopping of the hybrid vehicle 100.

In one or more arrangements, the one or more data stores 315 can include vehicle acceleration data 319. The vehicle acceleration data 319 can include data acquired by the sensor system 320 of the hybrid vehicle 100. The vehicle acceleration data 319 can include acceleration data from learned and/or unlearned deceleration area(s), acceleration data from learned and/or unlearned stop(s), learned accelerations, acceleration profiles, accelerator pedal data, acceleration records, acceleration learning records, acceleration learning, brake pedal data, location data, temporal data, distance data, and/or any data associated with the acceleration of the hybrid vehicle 100, including any acceleration data and/or analysis of acceleration data described herein.

As noted above, the hybrid vehicle 100 can include the sensor system 320. The sensor system 320 can include one or more sensors. "Sensor" means any device, component and/or system that can detect, and/or sense something. The one or more sensors can detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 320 includes a plurality of sensors, the sensors can work independently from each other. Alternatively, two or more of the sensors can work in combination with each other. In such case, the two or more sensors can form a sensor network. The sensor system 320 and/or the one or more sensors can be operatively connected to the processor(s) 310, the data store(s) 315, and/or other element of the hybrid vehicle 100 (including any of the elements shown in FIG. 3). The sensor system 320 can acquire data of at least a portion of the external environment of the hybrid vehicle 100 (e.g., nearby vehicles).

The sensor system 320 can include any suitable type of sensor. For instance, the sensor system 320 can include one or more vehicle sensors 321, which can detect, determine, and/or sense information about the hybrid vehicle 100 itself (e.g., position, orientation, speed, acceleration, deceleration, direction, accelerator pedal position, brake pedal position, pedal position, steering wheel position, etc.). In one or more arrangements, the one or more vehicle sensors 321 can include various inertial sensors such as gyroscopes and accelerometers, speedometers, vehicle wheel speed sensors, road condition sensors, suspension height sensors, steering angle sensors, steering torque sensors, brake pedal pressure sensors, accelerator pedal pressure sensors, pedal position sensors, and/or tire pressure sensors, just to name a few possibilities.

Alternatively, or in addition, the sensor system 320 can include one or more environment sensors 322, which can be configured to acquire, and/or sense data or information about the external environment in which a vehicle is located or one or more portions thereof. For example, such data or information can be related to obstacles in at least a portion of the external environment of the hybrid vehicle 100 and/or other things in the external environment of the hybrid vehicle 100, such as, for example, lane markers, signs, traffic lights, traffic signs, lane lines, crosswalks, curbs proximate the hybrid vehicle 100, off-road objects, etc. In one or more arrangements, the sensor system 320 can include one or more radar sensors, one or more LIDAR sensors, one or more sonar sensors, one or more cameras, and/or one or more ranging sensors.

The hybrid vehicle 100 can include an input system 330. An "input system" includes any device, component, system, element or arrangement or groups thereof that enable information/data to be entered into a machine. The input system 330 can be configured to receive an input from a vehicle occupant (e.g. a driver or a passenger). The hybrid vehicle 100 can include an output system 335. An "output system" includes any device, component, system, element or arrangement or groups thereof that enable information/data to be presented to a vehicle occupant (e.g. a person, a vehicle occupant, etc.). The output system 335 can be configured to present information/data to a vehicle occupant. Some components of the hybrid vehicle 100 may serve as both a component of the input system 330 and a component of the output system 335. In one or more arrangements, the output system 335 can include one or more displays, one or more projectors, and/or one or more speakers.

The hybrid vehicle 100 can include one or more vehicle systems 340. Various examples of the one or more vehicle systems 340 are shown in FIG. 3. However, the hybrid vehicle 100 can include more, fewer, or different vehicle systems. It should be appreciated that although particular vehicle systems are separately defined, each or any of the systems or portions thereof may be otherwise combined or segregated via hardware and/or software within the hybrid vehicle 100. The hybrid vehicle 100 can include a propulsion system, a braking system, a regenerative braking system, a steering system, throttle system, a transmission system, a signaling system, and/or a navigation system. Each of these systems can include one or more mechanisms, devices, elements, components, systems, and/or combination thereof, now known or later developed.

The hybrid vehicle 100 can include a navigation system 350. The navigation system 350 can include one or more devices, applications, and/or combinations thereof, now known or later developed, configured to determine the geographic location of the hybrid vehicle 100 and/or to determine a travel route for the hybrid vehicle 100. The navigation system 350 can include one or more mapping applications to determine a travel route for the hybrid vehicle 100. The navigation system 350 can include a global positioning system, a local positioning system or a geolocation system.

The hybrid vehicle 100 can include the one or more autonomous driving modules 360. The autonomous driving module(s) 360 can be configured to receive data from the sensor system 320 and/or any other type of system capable of capturing information relating to the hybrid vehicle 100 and/or the external environment of the hybrid vehicle 100. In one or more arrangements, the autonomous driving module(s) 360 can use such data to generate one or more driving scene models. The autonomous driving module(s) 360 can determine the position and velocity of the hybrid vehicle 100. The autonomous driving module(s) 360 can determine the location of obstacles, or other environmental features including traffic signs, trees, shrubs, neighboring vehicles, pedestrians, etc.

The autonomous driving module(s) 360 can be configured to receive, and/or determine location information for obstacles within the external environment of the hybrid vehicle 100 for use by the processor(s) 310, and/or one or more of the modules described herein to estimate position and orientation of the hybrid vehicle 100, vehicle position in global coordinates based on signals from a plurality of satellites, or any other data and/or signals that could be used to determine the current state of the hybrid vehicle 100 or determine the position of the hybrid vehicle 100 with respect to its environment for use in either creating a map or determining the position of the hybrid vehicle 100 in respect to map data.

The autonomous driving module(s) 360 can be configured to determine travel path(s), current autonomous driving maneuvers for the hybrid vehicle 100, future autonomous driving maneuvers and/or modifications to current autonomous driving maneuvers based on data acquired by the sensor system 320, driving scene models, and/or data from any other suitable source. "Driving maneuver" means one or more actions that affect the movement of a vehicle. Examples of driving maneuvers include: accelerating, decelerating, braking, turning, moving in a lateral direction of the hybrid vehicle 100, changing travel lanes, merging into a travel lane, and/or reversing, just to name a few possibilities. The autonomous driving module(s) 360 can be configured can be configured to implement determined driving maneuvers. The autonomous driving module(s) 360 can cause, directly or indirectly, such autonomous driving maneuvers to be implemented. The autonomous driving module(s) 360 can be configured to execute various vehicle functions and/or to transmit data to, receive data from, interact with, and/or control the hybrid vehicle 100 or one or more systems thereof (e.g. one or more of vehicle systems 340).

As used herein, "cause" or "causing" means to make, force, compel, direct, command, instruct, and/or enable an event or action to occur or at least be in a state where such event or action may occur, either in a direct or indirect manner.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for delaying a start of an internal combustion engine ("ICE") in a hybrid vehicle, comprising:
   identifying a stopping location for the hybrid vehicle;
   identifying a regenerative braking event for the hybrid vehicle that assists in stopping the hybrid vehicle at the stopping location;
   identifying an actual energy value based on a regenerative braking energy generated during the regenerative braking event;
   determining an estimated energy value based on a predicted regenerative braking energy from a predicted braking event causing the hybrid vehicle to stop at the stopping location, wherein the predicted braking event is based on user braking data, the user braking data being based on at least one of a statistical analysis of driver behavior patterns associated with braking or a historic stopping location associated with the stopping location;
   determining an energy savings value based, at least in part, on a difference between the actual energy value and the estimated energy value; and
   responsive to the ICE being off, determining an existence of a condition to delay the start of the ICE, the condition being based, at least in part, on the energy savings value.

2. The method of claim 1, further comprising:
   determining a cut-off time based on a battery discharge limit, the cut-off time being a maximum amount of time the start of the ICE is delayed; and
   responsive to a driver power demand exceeding an engine start threshold, calculating a driver energy demand from the driver power demand for a region above the engine start threshold.

3. The method of claim 2, further comprising:
   responsive to the driver energy demand being less than the energy savings value and the cut-off time not being exceeded, resetting a residual energy value to zero and delaying, based on a determination of the existence of the condition, the start of the ICE.

4. The method of claim 2, further comprising:
responsive to the driver energy demand being equal to the energy savings value, resetting the driver energy demand to zero, resetting a residual energy value to zero and starting, based on a determination of a lack of the existence of the condition, the ICE.

5. The method of claim 2, further comprising:
responsive to the driver energy demand being less than the energy savings value and the cut-off time being exceeded, resetting the driver energy demand to zero, calculating a residual energy value by subtracting the driver energy demand from the energy savings value and starting, based on a determination of a lack of the existence of the condition, the ICE.

6. The method of claim 2, further comprising:
responsive to a residual energy value being greater than zero and the driver power demand exceeding the engine start threshold, reducing the residual energy value based the driver energy demand and delaying, based on a determination of the existence of the condition, the start of the ICE.

7. The method of claim 2, wherein the cut-off time is obtained from a lookup table.

8. A delay system for delaying a start of an internal combustion engine ("ICE") in a hybrid vehicle, the delay system comprising:
one or more processors; and
a memory communicably coupled to the one or more processors and storing:
an energy module including instructions that when executed by the one or more processors cause the one or more processors to:
identify a stopping location for the hybrid vehicle;
identify a regenerative braking event for the hybrid vehicle that assists in stopping the hybrid vehicle at the stopping location;
identify an actual energy value based on a regenerative braking energy generated during the regenerative braking event;
determine an estimated energy value based on a predicted regenerative braking energy from a predicted braking event causing the hybrid vehicle to stop at the stopping location, wherein the predicted braking event is based on user braking data, the user braking data being based on at least one of a statistical analysis of driver behavior patterns associated with braking or a historic stopping location associated with the stopping location; and
determine an energy savings value based, at least in part, on a difference between the actual energy value and the estimated energy value; and
a threshold module including instructions that when executed by the one or more processors cause the one or more processors to:
responsive to the ICE being off, determine an existence of a condition to delay the start of the ICE, the condition being based, at least in part, on the energy savings value.

9. The delay system of claim 8, wherein the threshold module further includes instructions to:
determine a cut-off time based on a battery discharge limit, the cut-off time being a maximum amount of time the start of the ICE is delayed; and
responsive to a driver power demand exceeding an engine start threshold, calculate a driver energy demand from the driver power demand for a region above the engine start threshold.

10. The delay system of claim 9, wherein the threshold module further includes instructions to:
responsive to the driver energy demand being less than the energy savings value and the cut-off time not being exceeded, reset a residual energy value to zero; and
delay, based on a determination of the existence of the condition, the start of the ICE.

11. The delay system of claim 9, wherein the threshold module further includes instructions to:
responsive to the driver energy demand being equal to the energy savings value, reset the driver energy demand to zero;
reset a residual energy value to zero; and
start, based on a determination of a lack of the existence of the condition, the ICE.

12. The delay system of claim 9, wherein the threshold module further includes instructions to:
responsive to the driver energy demand being less than the energy savings value and the cut-off time being exceeded, reset the driver energy demand to zero;
calculate a residual energy value by subtracting the driver energy demand from the energy savings value; and
start, based on a determination of a lack of the existence of the condition, the ICE.

13. The delay system of claim 9, wherein the threshold module further includes instructions to:
responsive to a residual energy value being greater than zero and the driver power demand exceeding the engine start threshold, reduce the residual energy value based the driver energy demand; and
delay, based on a determination of the existence of the condition, the start of the ICE.

14. The delay system of claim 9, wherein the cut-off time is obtained from a lookup table.

15. A non-transitory computer-readable medium delaying a start of an internal combustion engine ("ICE") in a hybrid vehicle and storing instructions that when executed by one or more processor cause the one or more processors to:
identify a stopping location for the hybrid vehicle;
identify a regenerative braking event for the hybrid vehicle that assists in stopping the hybrid vehicle at the stopping location;
identify an actual energy value based on a regenerative braking energy generated during the regenerative braking event;
determine an estimated energy value based on a predicted regenerative braking energy from a predicted braking event causing the hybrid vehicle to stop at the stopping location, wherein the predicted braking event is based on user braking data, the user braking data being based on at least one of a statistical analysis of driver behavior patterns associated with braking or a historic stopping location associated with the stopping location;
determine an energy savings value based, at least in part, on a difference between the actual energy value and the estimated energy value; and
responsive to the ICE being off, determine an existence of a condition to delay the start of the ICE, the condition being based, at least in part, on the energy savings value.

16. The non-transitory computer-readable medium of claim 15, wherein the computer-readable medium further includes instructions that when executed by the one or more processors cause the one or more processors to:
  determine a cut-off time based on a battery discharge limit, the cut-off time being a maximum amount of time the start of the ICE is delayed; and
  responsive to a driver power demand exceeding an engine start threshold, calculate a driver energy demand from the driver power demand for a region above the engine start threshold.

17. The non-transitory computer-readable medium of claim 16, wherein the computer-readable medium further includes instructions that when executed by the one or more processors cause the one or more processors to:
  responsive to the driver energy demand being less than the energy savings value and the cut-off time not being exceeded, reset a residual energy value to zero; and
  delay, based on a determination of the existence of the condition, the start of the ICE.

18. The non-transitory computer-readable medium of claim 16, wherein the computer-readable medium further includes instructions that when executed by the one or more processors cause the one or more processors to:
  responsive to the driver energy demand being equal to the energy savings value, reset the driver energy demand to zero;
  reset a residual energy value to zero; and
  start, based on a determination of a lack of the existence of the condition, the ICE.

19. The non-transitory computer-readable medium of claim 16, wherein the computer-readable medium further includes instructions that when executed by the one or more processors cause the one or more processors to:
  responsive to the driver energy demand being less than the energy savings value and the cut-off time being exceeded, reset the driver energy demand to zero;
  calculate a residual energy value by subtracting the driver energy demand from the energy savings value; and
  start, based on a determination of a lack of the existence of the condition, the ICE.

20. The non-transitory computer-readable medium of claim 16, wherein the computer-readable medium further includes instructions that when executed by the one or more processors cause the one or more processors to:
  responsive to a residual energy value being greater than zero and the driver power demand exceeding the engine start threshold, reduce the residual energy value based the driver energy demand; and
  delay, based on a determination of the existence of the condition, the start of the ICE.

21. A system, comprising:
  a processor; and
  a memory storing:
    an energy module including instructions that cause the processor to determine a difference between:
      energy consumed by a baseline regenerative braking event, determined from at least one of a statistical analysis of driver behavior patterns associated with braking or a historical stopping location associated with a specific stopping location, and
      energy consumed by an ideal regenerative braking event and
    a threshold module including instructions that cause the processor to determine an existence of a condition to delay a start of an internal combustion engine, the condition associated with the difference.

* * * * *

UNITED STATES PATENT AND TRADEMARK OFFICE
CERTIFICATE OF CORRECTION

| | | |
|---|---|---|
| PATENT NO. | : 11,214,254 B2 | |
| APPLICATION NO. | : 16/400605 | |
| DATED | : January 4, 2022 | |
| INVENTOR(S) | : Monica A. Vanterpool and Joshua D. Payne | |

It is certified that error appears in the above-identified patent and that said Letters Patent is hereby corrected as shown below:

In the Claims

Column 28, Claim 21, Line 29: delete "event and" insert --event; and--

Signed and Sealed this
Third Day of May, 2022

Katherine Kelly Vidal
*Director of the United States Patent and Trademark Office*